United States Patent [19]

Harris

[11] 4,146,327
[45] Mar. 27, 1979

[54] OPTICAL TRIANGULATION GAUGING SYSTEM

[75] Inventor: David E. Harris, Columbus, Ohio
[73] Assignee: Autech, Columbus, Ohio
[21] Appl. No.: 754,324
[22] Filed: Dec. 27, 1976
[51] Int. Cl.² ............................ G01C 3/00; G01J 1/36
[52] U.S. Cl. ........................................ 356/1; 250/204; 356/4
[58] Field of Search .................. 356/1, 4, 141, 152, 356/159–161; 250/201, 202, 204, 560

[56] References Cited

U.S. PATENT DOCUMENTS

| 2,740,901 | 4/1956 | Graham | 250/201 |
| 3,137,756 | 6/1964 | Gunther et al. | 356/1 |
| 3,829,220 | 8/1974 | Parkinson | 356/160 |
| 4,041,505 | 8/1977 | Hartmann | 250/201 X |

FOREIGN PATENT DOCUMENTS 1196748  7/1970  United Kingdom ............... 356/160

OTHER PUBLICATIONS

Bodlaj et al., *Applied Optics*, vol. 15, No. 6, pp. 1432–1436, Jun. 1976. 356–361.

*Primary Examiner*—S. C. Buczinski
*Attorney, Agent, or Firm*—Anthony D. Cennamo

[57] ABSTRACT

An optical triangulation gauging system utilizing the position of a scanned laser beam to determine the position of an unknown surface or material thickness by optical triangulation. The scanned laser beam is split into two components by a beam splitter, one component, the reference beam, is passed through a calibration reticle having alternate opaque and transparent bands. The alternate transmission and occultation of the beam viewed through the reticle is used to generate calibration pulses that accurately describe the location of the gauging beam. The gauging component of the scanned beam is projected on to the surface to be measured. The back scattered light from this surface is viewed at a given angle, through a lens system that focuses the light onto a split photo detector. The position of the reference beam is interrogated as the scan beam image passes from one side of the split detector to the other. The reticle line spacing, the view angle of the lenses, and the optical path lengths provide an accurate measurement of surface movement independent of surface color or composition.

7 Claims, 4 Drawing Figures

OPTICAL TRIANGULATION GAUGING SYSTEM

PRIOR ART AND BACKGROUND

Optical measuring systems utilizing light from a laser beam are known. One such system is the co-pending application, Ser. No. 566,413, for "Reticle Calibrated Diameter Gauge," by David E. Harris, et al., now U.S. Pat. No. 4,043,673 and assigned to the same assignee. In that co-pending system the occultation of the measuring beam by the object being measured generates a signal operative to control counting of the calibration pulses as an indication of the dimension being measured.

There are many other variations of the split beam reference/measuring signal comparison variations known to the prior art.

Each of the prior art optical measuring systems, although perhaps operable for their intended purpose, do have attendant disadvantages. These prior art systems generally utilize, for instance, a scanned photo diode matrix or complex vidicon. Particularly, the need for calibration and constant recalibration, incapacity for a low measurement rate, high resolution capabilities, in stability, accuracy, and dependence from surface color and composition errors have been encountered with these prior art optical measuring systems. These disadvantages in turn are reflected as tremendously costly.

SUMMARY OF THE INVENTION

The present invention is an optical gauging system utilizing the position of a scanned laser beam to determine the position of an unknown surface which can be used to gauge material thickness by optical triangulation.

The laser light beam passes through a focusing lens to a scanning mirror. The scanner, in turn, deflects the beam onto a beam splitter where the beam is divided into a measuring beam and a reference beam. The measuring beam from the splitter passes through a collimating lens to assure that the beam striking the workpiece is parallel and not diverging.

The reference beam is directed to a reticle—a photo transparency of a series of lines and spaces. In this way the reference beam is alternately transmitted and blocked as it passes through the reticle to a lens for focusing on a photo detector. The photo detector converts the movement across the reticle into a series of electrical calibration pulses.

The light striking the surface of the workpiece is back scattered and the back scattered light is focused onto a split photo detector. As the measuring beam scans across the surface of the workpiece, the focused back scattered light is imaged into a spot of light travelling back and forth across the split in the photo detector.

The output of the photo detector is fed to a balanced differential amplifier. When the light spot is on one half of the photo detector, there is a positive output; and when the light spot is on the other side of the photo detector, there is a negative output.

The number of pulses, counted by the calibration circuitry, that occur while the focused spot of light is on one half of the split photo detector is an accurate digital measurement of the position of the surface of the workpiece.

OBJECTS

It is accordingly a principal object of the present invention to provide a new and improved laser beam optical measuring system for the thickness measurement having particular application to the food, rubber, and plastics industry.

It is a further object to provide such an optical distance measuring system utilizing triangulation means that are independent of surface color or composition, capable of high resolution, stability, permanently calibrated, and reflect simplicity in construction and cost.

Other objects and features of the present invention will become apparent from the following detailed description when taken in conjunction with the drawings, in which:

DETAILED DESCRIPTION OF DRAWINGS

Figure 1:
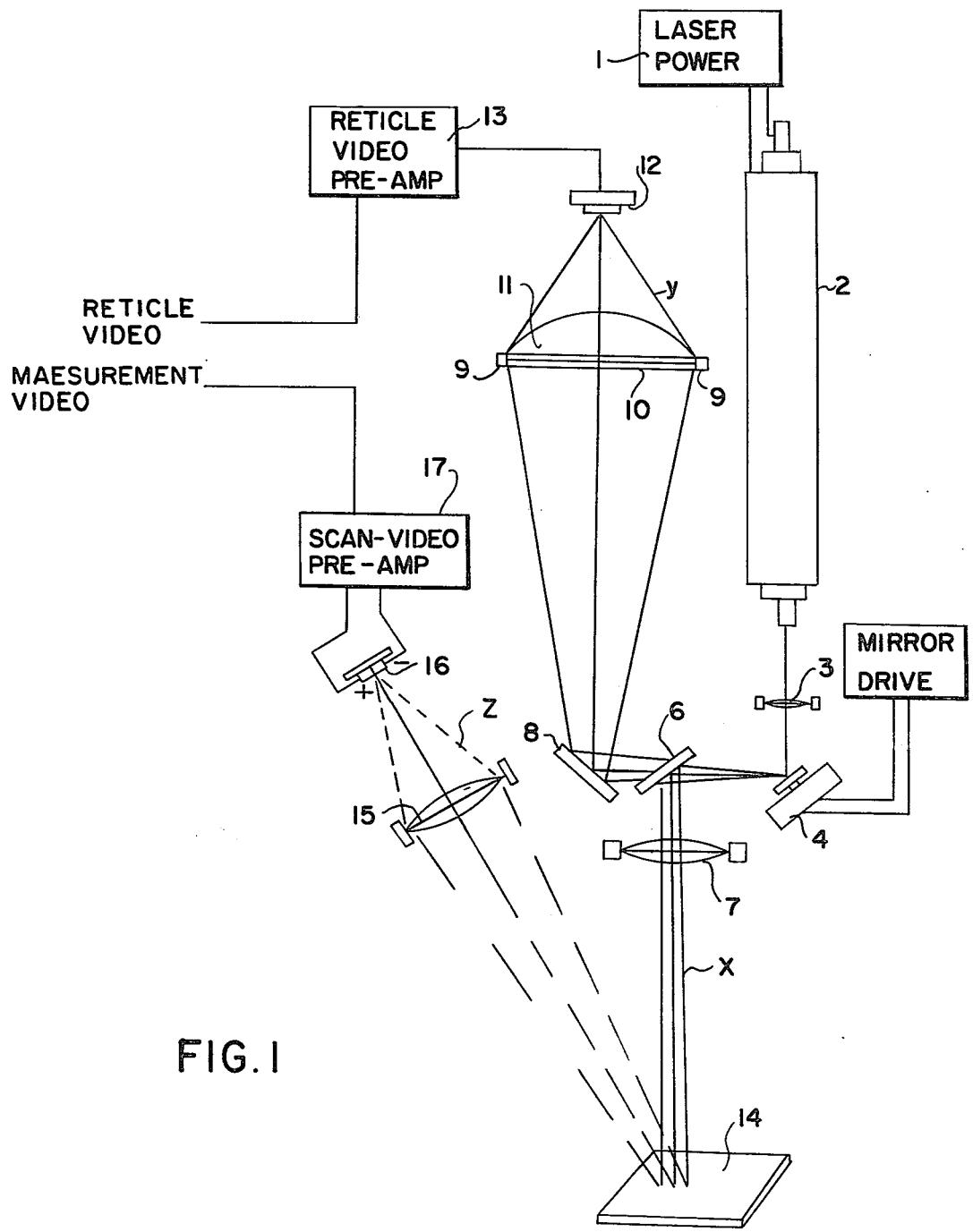
FIG. 1 illustrates schematically the components that comprise the optical portion of the gauging system of the present invention.

With particular reference now to FIG. 1, there is illustrated in block schematic the optical components of the gauging system of the present invention.

The laser 2, excited by a suitable power source or other light source that may comprise those known to the art such as galium arsinide diodes, halogen arc light, or other finely focused light beams. In that preferred embodiment there was used a helium neon laser light source capable of producing a light beam of the order of 50 ml. diameter. By suitable reduction by lens 3 the beam is reduced to a beam of the order of 15 ml. diameter at the reticle plane 10.

In operation of the components shown schematically in FIG. 1, the laser light beam strikes beam scanner 4. This scanner comprises a mirror 4 with a suitable drive comprising an oscillator. The scan mirror deflector 4 deflects the laser beam through an arc onto a beam splitter 6. In a conventional manner the beam splitter divides the scanned beam into two light components.

The first light component is the measuring beam x that strikes the workpiece 14. A collimating lens 7 is located in the path of the measuring beam between the beam splitter 6 and the workpiece 14 and located at its focal length away from the center of rotation of mirror 4. In this way the light beam x passing through focusing lens 7 is parallel, and not diverging.

The other component of light passing through the beam splitter 6 is the reference beam. The light passing through beam splitter 6 strikes mirror 8 and is reflected on to the reticle 10. The reticle 10 is a photo transparency of a series of lines and spaces of approximately 10 mils. width each. This reticle 10 does not form a part of the instant invention and may be that illustrated and described in U.S. Pat. No. 4,043,673, issued Aug. 23, 1977.

The light beam y, passing through reticle 10, is focused by lens 11 onto the photo detector 12. This photo detector 12 converts the movement of the calibration beam y into a series of electrical calibration pulses. Each pulse is calibrated to represent 20 mils. of movement of beam y across the reticle 10 and a much smaller—but proportional, movement of the measurement beam x across the surface of the workpiece 14.

The light back scattered light from surface 14 is focused by lens 15 onto split detector 16. The focused light z images into a tiny spot of light traveling back and forth across the split in the photo detector 16. The signal from the split detector 16 is fed into a ballanced differential pre amp 17.

As the measurement beam scans across the surface of the workpiece 14 and the light spot is on one half of detector 16, the output is positive from the pre amp 17. As the spot transitions to the other side of the split of the detector 16, the output of the pre amp 17 swings to negative. The number of pulses from detector 12 and the pre amp 13 that occur while the focused spot of light is on one half of detector 16 are an accurate digital measurement of the position of surface 14, relative to lens 7. The count of calibration pulses is dependent on the suitable selection of lens 15, together with the angle from which it views the surface, and by proper selection of the reticle spacing and optical path lengths. The resolution of the system may be further increased by using a phase locked loop (reference FIG. 3), that is, locking the voltage controlled oscillator 48 (FIG. 3) in phase with a harmonic multiple of the reticle pulse frequency.

Figure 2:
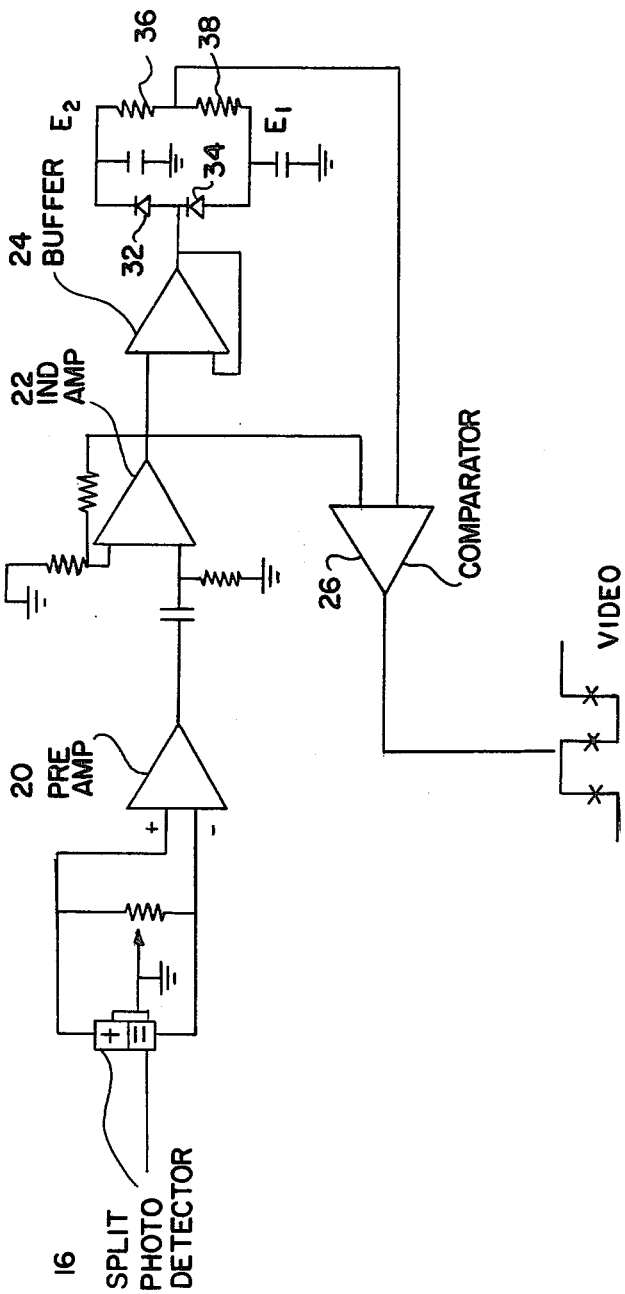
FIG. 2 is a measurement beam video circuit comparator in block schematic.

With reference now to FIG. 2, there follows discussion of the measurement beam video circuit and the auto-trigger point circuit. The back scattered light is focused on the split photo detector (16 of FIG. 1). Several prior art photo detectors have proven satisfactory, such as silicon photo diodes, cadmium sulphate cells, and silicon solar cells. The preferred embodiment utilizes a silicon solar cell which has proven to be a fairly sensitive high speed detector with a reasonable signal to noise ratio. Two such solar cells are cemented next to each other to make up the split detector 16. These cells are connected with short leads to a high gain differential amplifier 20. Since the amplifier 20 has complementary inputs, one positive and one negative, any ambient light that falls on both detectors will be subtracted out and accordingly, only the difference in the lighting of the two halves of the detector will be amplified.

The pre amp builds the video signal from several mili volts up to several volts where it can be sent back to the system mainframe for signal processing. In the mainframe, the signal may be further amplified by amplifier 22. This amplifier 22 is A.C. coupled to prevent amplifying any drifts or offsets in the pre amp or power supply to make a repeatable decision about when the video indicates that the spot of light has shifted from one side to the other on the detector 16, the signal is buffered in buffer 24 and then sent into a pair of detectors 32 and 34. One detector stores the maximum positive excursion of the signal and the other stores the maximum negative excursion. These stored peak voltages are sent through a voltage divider, resistors 36 and 38, to establish the voltage that represents the halfway point between the two extremes. The trigger output voltage from divider is sent to a voltage comparator 26 having the video signal at its other input. In determining the transition, the result is independent of the amplitude of the video signal, and therefore independent of the color of these surfaces we are measuring.

Figure 3:
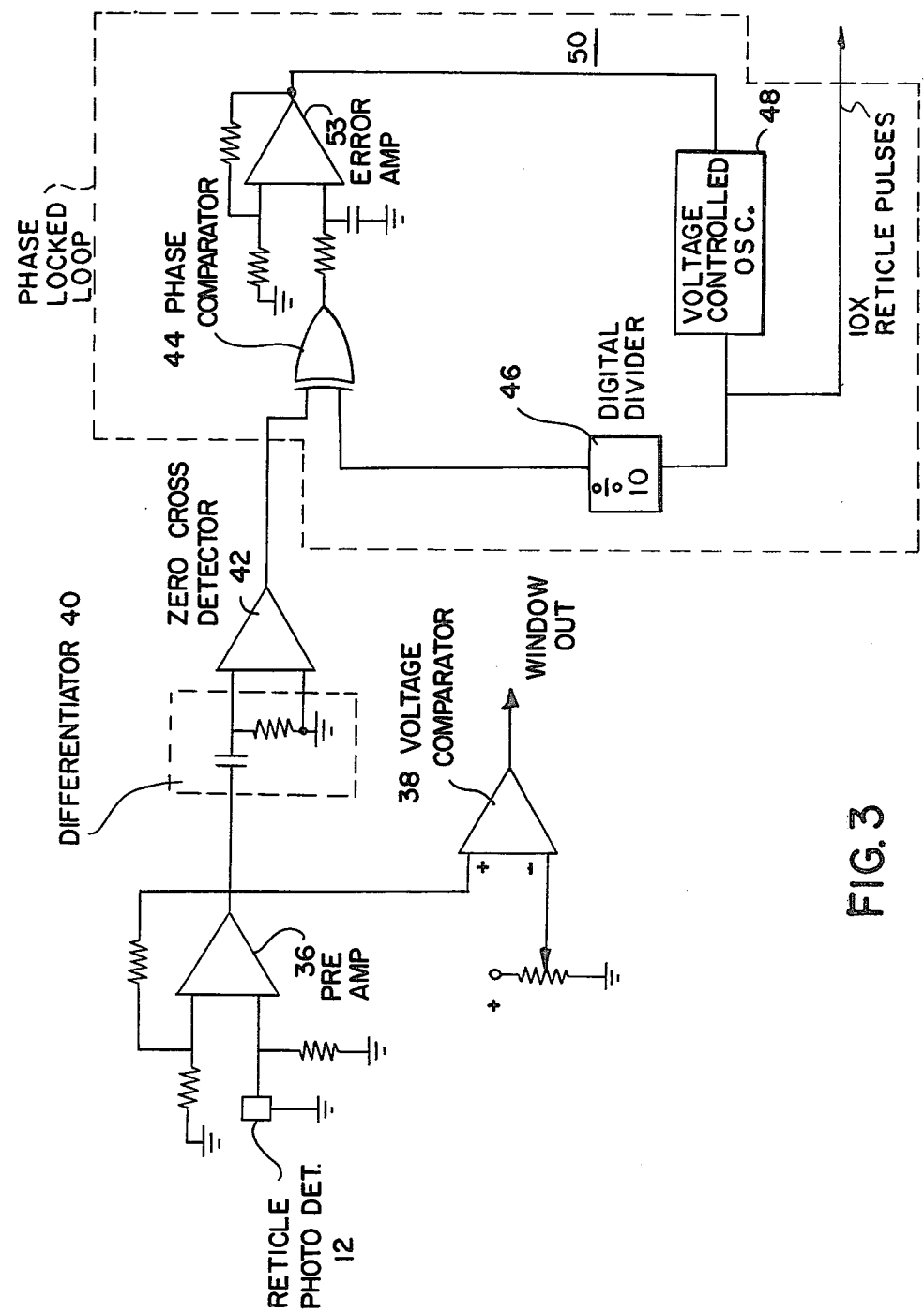
FIG. 3 is the reticle video process and phase locked loop in block schematic.

With reference now to FIG. 3, a discussion may now be had of the reticle video circuit and its signal processing including the phase locked loop.

The reticle video signal found on photo detector 12, of FIG. 1, is only a few millivolts in amplitude. It is amplified by a pre amp 36 to a level of around a volt for transmission back to the system mainframe. Due to the internal capacity of the silicon solar cell used for detector 12, the higher the frequency of the reticle pulses, the lower their amplitude. The scanning mirror 4 of FIG. 1 used to deflect the laser beam through its arc is a taut band device, that tends to scan in a sine wave motion at its own mechanical resonate frequency. The amplitude of the scan is not important as long as we scan the entire reticle and off its ends 9. The ends 9 of the reticle 10 are masked and since the mirror must go to zero velocity at its maximum angles, this "edge" pulse is of much longer duration, and therefore greater amplitude than the other reticle system pulses.

In order to determine the beginning and end of a given scan, these edge pulses must be detected. A simple voltage comparator FIG. 3 38 is set up to trigger whenever the voltage drops below a certain value, and the video signal from the reticle pre amp 36 is fed into this comparator 38. The resulting pulses, during the turning around of the scanning mirror, are called the window pulses. These pulses are used throughout the system to time and average.

Since the scan is sinusoidal, the reticle pulses are not all of equal amplitude, nor is the photo reticle always perfect. In order to make the reticle pulses more uniform with the variables, the video signal is differentiated by differentiator 40. The resulting pulses are symmetrically distributed about the zero volt line and can be easily used to trigger a zero crossing detector 42. The output of the zero crossing detector 42 is a series of pulses of uniform amplitude with full digital logic levels being maintained.

Figure 4:
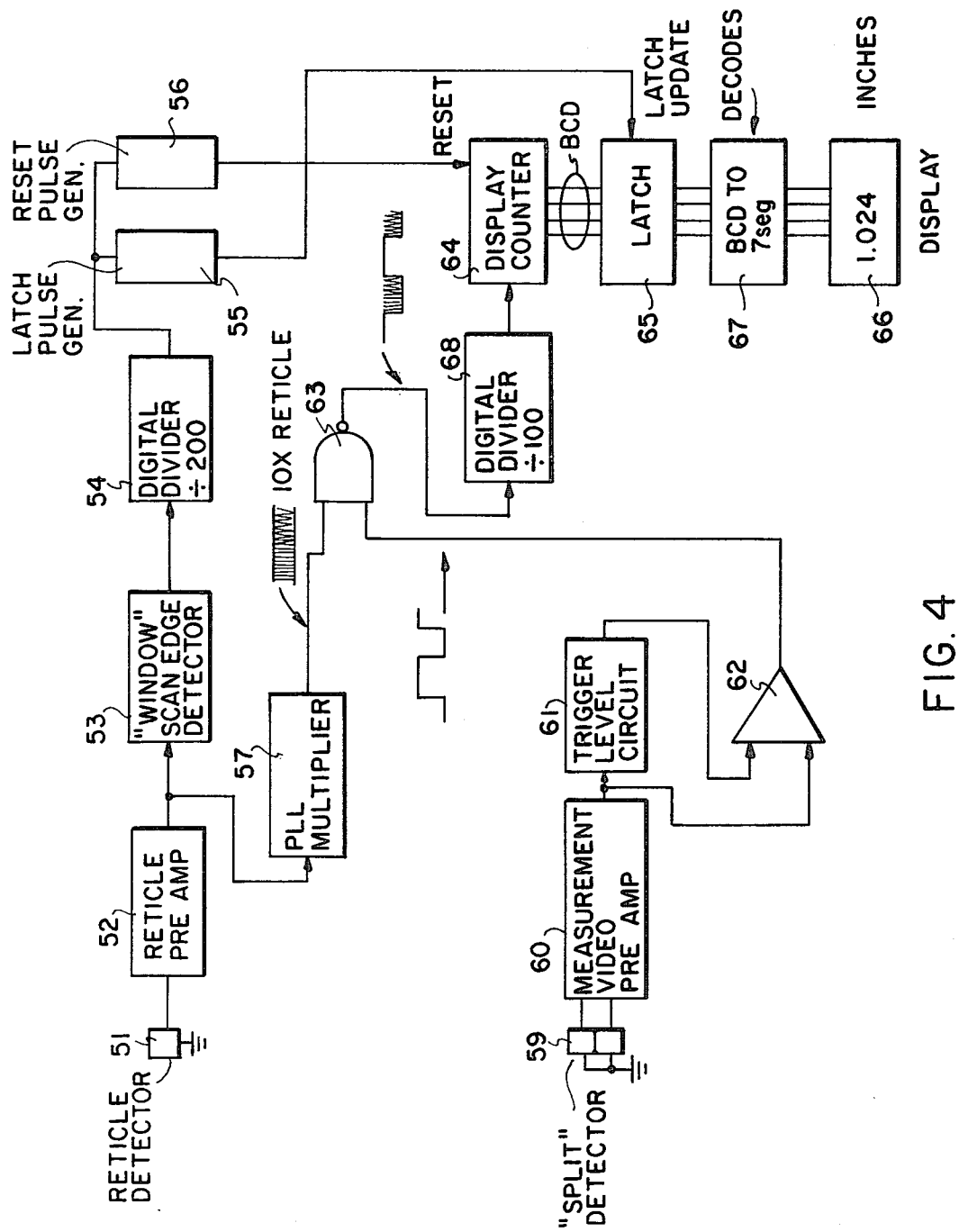
FIG. 4 is the overall system block diagram.

With continued reference to FIG. 3, the scanned laser dimension comparator reticle video processing may be described. Since each reticle pulse represents 20 mils. of calibration beam travel, and that corresponds to 5 mils of measurement beam movement, the reticle pulses alone could be counted to produce a digital representation of the measurement. In today's control technology however, greater resolution is expected of most measurement devices. In order to increase the resolution of the scanned laser dimension comparator, a phase locked loop 50 comprised of 44, 46, 48 and 53 is used to multiply the effective number of reticle pulses from zero detector 42. With reference to FIG. 4 the scanned laser beam passing through the reticle and reticle focusing lens falls on to the reticle detector 51 where it generates a series of pulses representing beam velocity and position. These low level electrical pulses are amplified by the reticle pre-amplifier 52 to a level of several volts. The amplified reticle video, as this signal is called, is sent into two different circuits. One circuit, the scan edge or "window" circuit 53 determines when the beam has scanned off the edge of the reticle. One window pulse is generated at each edge of the reticle. A digital divider 54 takes in 200 such "window" pulses, and puts out one window pulse in every 200, as a timing pulse. This timing pulse represents 100 complete "round trip" scans of the laser beam across the reticle. The timing pulse is sent to the latch pulse generator 55 and also to the reset pulse generator 56. These two generators are one shot multivibrators and are triggered into generating one very short duration pulse for each timing pulse input they receive.

The latch pulse generator puts out one short pulse on the leading edge of the timing pulse and the reset pulse generator one short pulse on the trailing edge. These pulses are used to reset a counter chain 64 and update a set of digital storage latches 65 that are connected to the counter outputs.

The reticle signal from the reticle preamp is also sent to the pulse multiplier 57 which converts the several volts of video into a full "logic" level pulse burst, and then, through the use of a phase locked loop, multiplies the frequency of those pulses to increase system resolution.

The image of the scanned measurement beam, as back scattered from the surface being measured, and focussed by a viewing lens onto the "split" detector 59, causes that detector and its pre-amp to generate a signal that is positive and then negative, depending on which half of the detector is illuminated by the image of the scanning spot of light. The level of this signal leaving the measurement video preamp 60 will be approximately 2 volts, but may vary considerably depending on several factors including laser power and the color and texture of the surface being measured. In order to insure adequate signal levels, AGC, Automatic Gain Control can be added to the preamp circuit (these techniques are well known to anyone familiar with radio and TV receiver circuits).

To insure a repeatable length video pulse with a possible drift in amplifier DC levels or changes in the signal level from any cause, the automatic trigger level circuit 61 shown in detail in FIG. 2 is employed. This circuit stores the peak positive and negative excursions of the video signal and then establishes video trigger voltage half way between the two extremes. The trigger level circuit 61 of FIG. 4 and its output trigger voltage is fed into one side of the measurement video voltage comparator FIG. 4, 62 while the original measurement video is fed into the other input. The output of voltage comparator 62, is a logic level pulse of a duration the same as the measurement video signal but with fast rise time and greater voltage level. The output of 62 is referred to as Video.

The video signal is fed to a NAND gate 63 with the multiplied reticle pulses from the phase locked loop on the other input. The resulting output from NAND Gate is a pulse burst containing all the multiplied reticle pulses that occured while the Video signal from comparator 62 was at Logic 1 and no pulses from where it was at logic zero.

The gated pulses from gate 63 are divided by divider 68 and counted by counter 61 for one complete scan cycle, the number of pulses counted provide an accurate digital count from counter 61 that is representative by display 66 of the relative position of surface 14 FIG. 1 with respect to the optical gauging system. This count is then stored in display latch 65 and displayed via decoder display 66.

Although a certain and specific embodiment of the present invention has been shown and described, it must be appreciated that modifications may be had thereto without departing from the true spirit and scope of the invention.

What is claimed is:

1. A non contact surface position sensing optical gauging system for thickness measurement or part dimensioning of an object comprising; a light source,
   a mirror positioned in the path of the light beam, and means for oscillating said mirror to periodically change the angle of incidence of the light beam to produce a periodic scan;
   means for splitting the scanned beam into a measuring beam and a calibrating beam;
   optical means in the path of the calibrating beam for alternately occulting and transmitting said beam as it moves said predetermined incremental distances,
   calibrating means responsive to predetermined increments of calibrating beam motion to generate a series of pulses;
   means for directing the measuring beam onto an object; a split photo detector, and means for focusing the back scattered light from said object on alternate halves of said split photo detector;
   means for counting said number of pulses generated by said calibrating means, and
   means for comparing said calibrating pulses with said number of pulses counted in said alternate halves of said photo detector.
   means for correlating said comparison of pulses as a measurement of the displacement of the surface of the object.

2. The system defined in claim 1, wherein said means for directing said measuring beam onto said object comprises a collimating lens whereby said measuring beam scans said object along a succession of parallel paths.

3. The system defined in claim 1, further comprising an operational amplifier connected to said split photo detector having complementary inputs and an output indicative only of the difference of the lighting of said two halves of said split photo detector.

4. The system defined in claim 1, wherein said light source is a laser beam.

5. The system of claim 1, wherein said calibration means includes a reticle having alternate opaque and transparent bands.

6. The system of claim 5, wherein said reticle pulses define said pulses counted.

7. The system of claim 1, further including means for interrogating said reference beam as the scan beam image passes from one side of said split photo detector to the other.

* * * * *